United States Patent [19]

Straruts

[11] 4,117,334

[45] Sep. 26, 1978

[54] PORTABLE X-RAY UNIT WITH SELF-CONTAINED VOLTAGE SUPPLY

[75] Inventor: Eric J. Strauts, Park Ridge, Ill.

[73] Assignee: Magnaflux Corporation, Chicago, Ill.

[21] Appl. No.: 786,373

[22] Filed: Apr. 11, 1977

[51] Int. Cl.[2] .............................................. G03B 41/16

[52] U.S. Cl. .................................... 250/402; 250/409; 250/413; 250/421

[58] Field of Search ............... 250/421, 422, 417, 418, 250/413, 401, 402

[56] References Cited

U.S. PATENT DOCUMENTS

| | | | |
|---|---|---|---|
| 2,168,801 | 8/1939 | Lee | 250/418 |
| 2,217,483 | 10/1940 | Kearsley | 250/413 |
| 3,125,679 | 3/1964 | Ohde | 250/402 |

*Primary Examiner*—Craig E. Church

*Attorney, Agent, or Firm*—Brezina & Lund

[57] ABSTRACT

An X-ray unit is provided having a self-contained high voltage supply including a pair of capacitors charged through diodes from a pair of transformer secondary windings and connected in series through the windings to the anode and cathode of an X-ray tube. Switching means are provided for operation either in a first mode in which the alternating voltages across the secondary windings are in phase and in which the output voltage is equal to the sum of the DC voltages across the capacitors to be substantially constant, and a second mode in which the alternating voltages across the secondary windings are out of phase and in which they are added to produce a pulsating output voltage having a peak value which is approximately double that of the substantially constant voltage obtained in the first mode of operation.

3 Claims, 3 Drawing Figures

PORTABLE X-RAY UNIT WITH SELF-CONTAINED VOLTAGE SUPPLY

This invention relates to a portable X-ray unit having a self-contained voltage supply and more particularly to such a unit in which a substantially constant high voltage is applied to the X-ray tube thereof. The unit uses conventional types of components in a comparatively simple circuit arrangement and is economically manufacturable while being compact, efficient and reliable. The unit is selectively operable with pulsating voltages having very high peak amplitudes.

BACKGROUND OF THE INVENTION

In prior art X-ray systems, the power supplies used for applying high voltages to X-ray tubes have generally included relatively large step-up transformers and capacitors with oil or other special insulating mediums and have been quite bulky and heavy in weight. When a movable or portable X-ray tube unit is desired, flexible high voltage cables have been used between the power supply and the tube unit, the cables also requiring oil or other special insulating mediums for proper insulation with respect to the very high voltages used. Arrangements have been provided in which high voltage power supply components have been located in the X-ray tube unit itself to eliminate the need for a high voltage cable. In such arrangements, the required size of the power supply components is reduced by using a higher operating frequency, such as 600 Hz rather than 60 Hz. Also, circuit arrangements have been used in which a pair of capacitors are charged from the secondary windings of a pair of transformers with the voltages across the capacitors and the voltages across the secondary windings being combined in series to produce an output voltage having a very high peak value, nearly equal to four times the peak value of the voltage across each transformer winding.

The voltage so produced is, however, of a pulsating form with the peak value being produced at only one point in each cycle of operation.

Accordingly, for portable or movable X-ray tube units, the choice has been between one in which the tube unit is connected to a heavy power supply through a high voltage cable or one in which the unit has a self-contained power supply but in which a pulsating voltage is applied to the X-ray tube.

SUMMARY OF THE INVENTION

This invention was evolved with the general object of overcoming the disadvantages of prior art X-ray systems and of providing a system in which a X-ray tube unit is portable while being operable to generate X-rays in an optimum manner.

Another object of the invention is to provide an X-ray system which is comparatively simple in construction and operation and economically manufacturable while being efficient and reliable and which also is versatile, being usable in a variety of applications.

In accordance with this application, an X-ray system is provided in which step-up transformer, capacitor and other power supply components are included within a portable unit also containing an X-ray tube to supply a high voltage directly to the tube and in which the potential of the high voltage applied to the tube is substantially constant, rather than being a pulsating voltage as in the prior art units. The use of a constant potential has very important advantages from a radiographic standpoint in that the spectrum of X-rays produced is more uniform and images of higher resolution and better quality are obtained. In addition, the required exposure time is reduced and it is also possible to use the system in fluoroscopy or other applications in which systems with pulsating supply voltages are not usable. Most importantly, no high voltage cable and no heavy and bulky power supplies are required and many problems associated therewith are obviated. For example, there can be no problem with oil used as a dielectric in a high voltage cable because there is no high voltage cable. Electrical power is supplied to the unit at a relatively low voltage, presenting no insulating problems. A higher power frequency such as 600 Hz may be used, rather than 60 Hz, to minimize the size of the power supply components in the unit.

In accordance with a specific feature, a circuit is used in which the substantially constant voltage applied to the X-ray tube is the sum of the voltages produced across two capacitors, one of which is charged at the peak of half-cycles of one polarity and the other of which is charged during the peaks of the half-cycles of the opposite polarity. The voltage rating for each capacitor may thus be on the order of one-half the total voltage applied to the X-ray tube. Preferably, two separate transformer secondary windings are used for charging the capacitors, and most preferably, the windings are of separate transformers, the circuit having a balanced and symmetrical configuration.

An important feature is in the provision of switch means for selective operation either in a first mode in which the voltage applied to the X-ray tube is substantially constant, as above described, and a second mode in which the voltage applied to the X-ray tube is of a pulsating form, but having a much higher peak amplitude, on the order of twice that of the constant voltage or constant potential mode.

In the circuit as above described in which a pair of capacitors are charged from a pair of transformer secondary windings, the second mode of operation is obtained by reversing the phase of the voltage across one of the windings relative to that across the other of the windings in a manner such that the voltage applied to the X-ray tube is the sum of the DC voltages across the two capacitors and the AC voltages across the windings, the peak value of the output voltage being nearly equal to four times the peak value of the voltage across each secondary winding.

In the arrangement in which two separate transformers are used, the switching from one mode to the other is obtained in a very simple manner, by reversing one of the primary windings relative to the other.

It is noted that while the first mode of operation has distinct advantages with respect to obtaining higher resolution and better quality images as well as reduced exposure times, the second mode has advantages in applications in which higher penetration is required. By way of example, with a voltage of on the order of 150 kilovolts, the penetration is limited to around ½ inch of steel whereas with 300 kilovolts, from one and one-half to 2 inches of steel may be penetrated.

This invention contemplates other objects, advantages and features which will become more fully apparent from the following detailed description taken in conjunction with the accompanying drawings.

DESCRIPTION OF A PREFERRED EMBODIMENT

Figure 1:
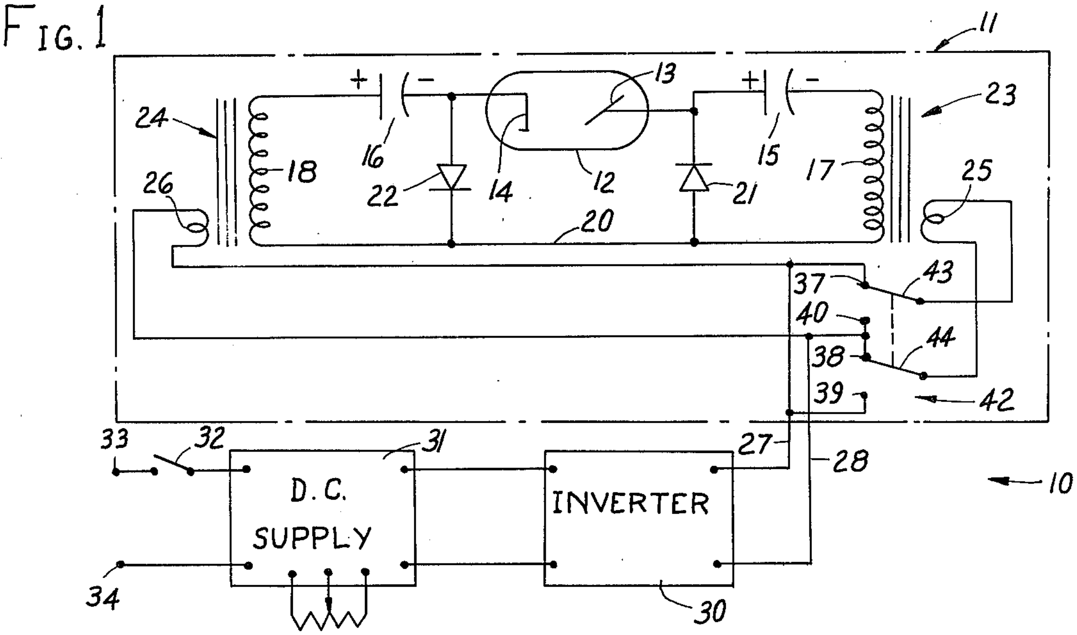
FIG. 1 is a schematic circuit diagram of an X-ray system constructed in accordance with the system.

Reference numeral 10 generally designates an X-ray system constructed in accordance with the principles of this invention. The system 10 comprises a portable unit 11 which includes an X-ray tube 12 having an anode 13 and a cathode 14. The cathode 14 is heated by conventional means, not shown, to emit electrons which are accelerated through the application of a very high potential difference between the anode 13 and cathode 14, to impinge on the anode 13 at high velocity and to generate X-rays, the anode 13 including a suitable target material. The X-ray tube 12 may, for example, be constructed in accordance with the teachings of the Weiss U.S. Pat. No. 3,358,168.

The unit 11 which is designed to be movable or portable, has a self-contained high voltage power supply. In particular, the anode 13 and cathode 14 are directly connected to terminals of a pair of capacitors 15 and 16 the opposite terminals of which are connected to end terminals of a pair of transformer secondary windings 17 and 18. Opposite terminals of the windings 17 and 18 are connected to a common line 20 and a pair of diodes 21 and 22 are connected between line 20 and the anode 13 and cathode 14, the cathode of diode 21 being connected to the anode 13 and the anode of diode 22 being connected to the cathod 14.

The windings 17 and 18 in the illustrated embodiment are secondary windings of separate transformers 23 and 24 which have primary windings 25 and 26. AC current is supplied to the windings 25 and 26, preferably at a relatively high power frequency such as 600 Hz, for example, a high frequency being used for the purpose of minimizing the required size for the capacitors 15 and 16 and transformers 23 and 24. In the system as illustrated, the AC current is supplied through line 27 and 28 from output terminals of an inverter 30 having input terminals connected to output terminals of a DC supply 31, connected through a switch 32 to input terminals 33 and 34 which may be connected to a suitable 60 Hz supply source. A suitable control such as a potentiometer 36 as illustrated may be associated with the DC supply 31 for the purpose of regulating the output thereof, to thereby regulate the output of the inverter 30 and the voltage developed by the high voltage supply of the unit 11. The lines 27 and 28 from the output of the inverter 30 are connected directly to the winding 26 and are also connected, respectively, to a pair of terminals 37 and 38 and another pair of terminals 39 and 40 of a switch 42 having a pair of movable contacts 43 and 44 connected to the primary winding 25 of transformer 23. In the position of the contacts 43 and 44 as illustrated, one mode of operation is obtained in which a pulsating high voltage is applied between the anode 13 and cathode 14 of the X-ray tube 12. In an alternate position in which contacts 43 and 44 are engaged with contacts 40 and 39, respectively, another mode of operation is obtained in which a substantially constant voltage or potential is applied between the anode 13 and cathode 14 of the X-ray tube 12.

Figure 2:
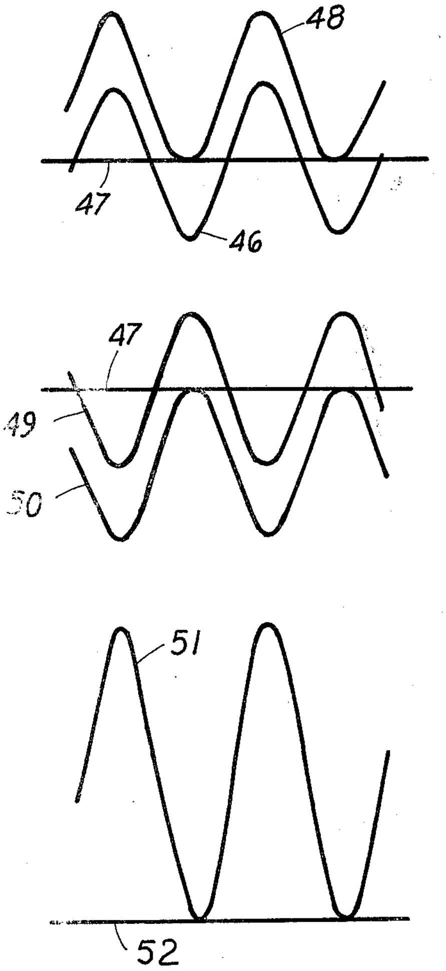
FIG. 2 depicts the wave forms at certain points of the circuit of FIG. 1 during a pulsating voltage mode of operation.
Figure 3:
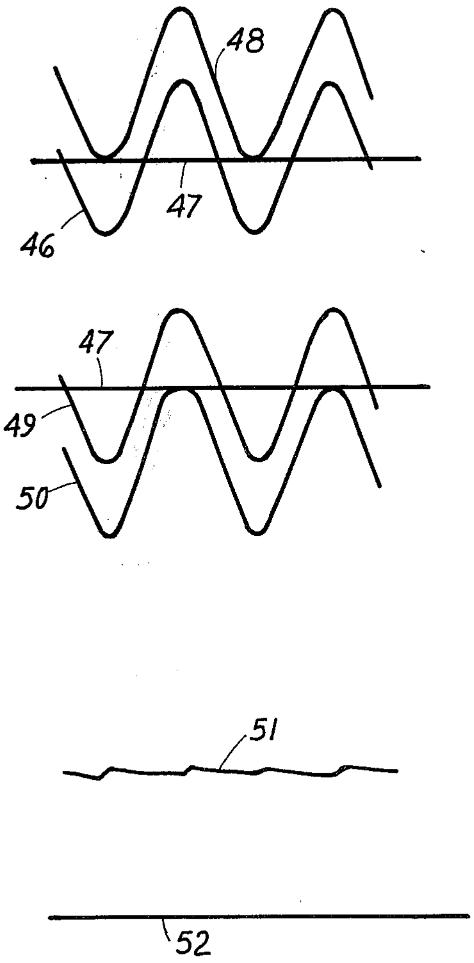
FIG. 3 is similar to FIG. 2 but depicts the wave forms at the same points of the circuit during a constant voltage mode of operation.

The manner in which these two modes of operation are obtained is illustrated graphically in FIGS. 2 and 3. FIG. 2 shows the wave forms at certain points of the circuit in the position of the switch 42 as illustrated, i.e. the position for producing a pulsating output voltage. Reference numeral 46 indicates the wave form of the voltage at the top end of the secondary winding 17, the reference used being that of the line 20, the potential of line 20 being thus indicated by the horizontal line 47. When the potential of the top end of the secondary winding 17 swings in a negative direction, the capacitor 15 may be charged through the diode 21, the capacitor 15 being thus charged to substantially the peak value of the voltage, with a polarity as indicated in FIG. 1. Reference numeral 48 indicates the wave form at the left-hand terminal of the capacitor 15, i.e. at the anode 13, it being noted that when the potential at the upper end of the lining 17 is at its maximum positive value, the anode 13 is at a much more positive potential, nearly twice the maximum positive potential of the voltage at the upper end of the winding 17.

Reference numeral 49 indicates the wave form of the voltage at the upper end of the left-hand winding 18, again with respect to the line 20, the potential of which is indicated by the horizontal line 47. In this case, the capacitor 16 is charged when the potential at the upper end of winding 18 goes positive, being charged substantially to the peak value with a polarity as indicated. As a result, the wave form of the voltage at the cathode 14 is as indicated by reference numeral 50, going to a peak negative value of nearly twice the peak negataive value of the voltage at the top end of the winding 18.

Reference numeral 51 indicates the wave form obtained by subtracting wave form 50 from wave form 48 and thus indicates the wave form at the anode 13 relative to the cathode 14. Thus, the horizontal line 52 is the reference potential of the cathode 14 against which the potential of the anode 13 is plotted by wave form 51.

It is noted that the anode-cathode voltage is pulsating and that it reaches a peak value nearly equal to four times the peak value of the voltage produced by either of the secondary windings 17 or 18. If, for example, the peak value of the voltage produced by each of the secondary windings is 75 kilovolts, the peak anode-cathode voltage is nearly 300 kilovolts. A very high voltage so obtained is important in many applications as, for example, where it is desired to penetrate large thicknesses. With 300 kilovolts, it is possible to penetrate from 1.5 to 2 inches of steel, for example.

FIG. 3 illustrates the wave forms produced at the same points in the circuit, but with the position of the switch 42 changed to engage contacts 43 and 44 with terminals 40 and 39, to thus reverse the phase of voltage applied to the primary winding 25 relative to that applied to the primary winding 26. In this case, when the wave form 50 is subtracted from the wave form 48, it is found that there is a substantially constant difference therebetween, with only a slight ripple effect due to discharging of the capacitors 15 and 16.

With the constant potential mode of operation as depicted in FIG. 3, the spectrum of the X-rays produced is more uniform and a high resolution with high resolution with high quality images are obtained. It is also possible to use the unit in fluoroscopic applications and the like, in which a pulsating generation of X-rays would not be suitable. On the other hand, with the pulsating operation of FIG. 2, higher intensity and somewhat shorter wave length X-rays can be produced for deeper penetration, as required in some applications.

Through the use of a pair of capacitors and also through the use of a pair of secondary windings, preferably with separate transformers, and with a symmetrical balanced arrangement, the physical construction of the unit in a manner to minimize arcing is facilitated and, also, the peak voltage produced across each capacitor and hence its required voltage rating, is only half of the output voltage in the constant potential mode and only one fourth the peak output voltage in the pulsating mode. Preferably, as above noted, a supply voltage having a higher frequency such as 600 Hz is used to minimize the required sizes of the transformers 23 and 24 and capacitors 15 and 16.

The shift from one mode of operation to the other is obtained quite simply through the reversing switch 42 and it is noted that although the switch is shown located in the portable unit 11, it could be physically located in a stationary position with four lines extending to the primary windings 25 and 26.

It will be understood that other modifications and variations may be effected without departing from the spirit and scope of the novel concepts of this invention.

I claim as my invention:

1. In X-ray apparatus, a portable unit including an X-ray tube having a cathode and an anode, means for supplying alternating current to said unit at a relatively low voltage level and high voltage transformer means having primary and secondary winding means in said unit for transforming said alternating current to a high voltage applied between said cathode and said anode of said X-ray tube, said unit comprising: capacitor means, diode means, first connection means for applying said AC current to said primary winding means, and second connection means interconnecting said secondary winding, capacitor and diode means and said anode and cathode of said X-ray tube for operation in a first mode in which said capacitance means are charged to a high potential during each cycle of said alternating current and in which a substantially constant corresponding potential is maintained between said anode and said cathode of said X-ray tube, said diode means comprising first and second diodes each having a cathode and an anode, said capacitance means comprising first and second capacitors each having first and second terminals, and said second connection means including a first connection between said anode of said X-ray tube and said cathode of said first diode and said first terminal of said first capacitor, a second connection between said cathode of said X-ray tube and said anode of said second diode and said first terminal of said second capacitor and a third connection between said anode of said first diode and said cathode of said second diode with said secondary winding means being connected to said third connection and to said second terminals of said first and second capacitors, the AC voltages measured with reference to said third connection being in the same phase at said second terminals of said first and second capacitors in said first mode of operation in which a substantially constant potential is maintained between said anode and said cathode of said X-ray tube said portable unit further comprising phase switching means associated with at least one of said connection means for selective operation in a second mode in which the charge voltage developed across said capacitance means is added to the alternating voltage developed across said secondary winding means to produce a pulsating voltage applied between said anode and said cathode of said x-ray tube.

2. In apparatus as defined in claim 1, said transformer means comprising first and second transformers each having a primary winding and a secondary winding with said secondary winding of said first transformer being connected between said third connection and said second terminal of said first capacitor and with said secondary winding of said second transformer being connected between said third connection and said second terminal of said second capacitor, said first connection means being such that the alternating voltages across said secondary windings are in phase in said mode of operation in which a substantially constant potential is maintained between said anode and said cathode of said X-ray tube.

3. In apparatus as defined in claim 2, switch means associated with said first connection means for reversing the connection of one of said primary windings relative to the other to produce a second mode of operation in which the alternating voltage across said secondary windings are out of phase and in which the charge voltage developed across said first and second capacitors is added to the alternating voltages developed across said secondary windings to produce a pulsating voltage applied between said anode and said cathode of said X-ray tube with said pulsating voltage having a peak value of on the order of four times the peak value of the voltage developed across one of said secondary windings.

* * * * *